United States Patent [19]

Taylor

[11] Patent Number: 4,539,383

[45] Date of Patent: Sep. 3, 1985

[54] TEMPORARY POLYMERIC MORDANTS CONTAINING ACETOXYBENZYL SUBSTITUTED QUATERNARY AMMONIUM GROUPS

[75] Inventor: Lloyd D. Taylor, Lexington, Mass.

[73] Assignee: Polaroid Corporation, Cambridge, Mass.

[21] Appl. No.: 563,351

[22] Filed: Dec. 20, 1983

Related U.S. Application Data

[62] Division of Ser. No. 289,289, Aug. 3, 1981, Pat. No. 4,424,272.

[51] Int. Cl.$^3$ .................. C08F 220/58; C08F 220/70; C08F 20/70

[52] U.S. Cl. .................................. 526/304; 526/307; 526/310

[58] Field of Search ............... 526/304, 260, 263, 265; 564/285, 287, 288, 207, 208

[56] References Cited

U.S. PATENT DOCUMENTS

| | | | |
|---|---|---|---|
| 3,350,336 | 10/1967 | Kelley | 526/304 |
| 3,421,893 | 1/1969 | Taylor | 526/304 |
| 3,671,502 | 6/1972 | Lamour et al. | 526/304 |
| 4,108,802 | 8/1978 | Wright | 526/263 |
| 4,312,940 | 1/1982 | Nakamura et al. | 526/310 |
| 4,463,080 | 7/1984 | Snow et al. | 526/260 |

*Primary Examiner*—Joseph L. Schofer
*Assistant Examiner*—Peter F. Kulkosky
*Attorney, Agent, or Firm*—Louis G. Xiarhos

[57] ABSTRACT

Polymeric mordants which are capable of converting to non-mordanting species in an alkaline environment are described. The mordants can be used in photographic elements to temporarily mordant a photographically useful dye material, such as a light-filter or anti-halation dye or a diffusion transfer image dye-providing material, and then release the dye material during processing of the element with an alkaline processing composition.

15 Claims, 1 Drawing Figure

TEMPORARY POLYMERIC MORDANTS CONTAINING ACETOXYBENZYL SUBSTITUTED QUATERNARY AMMONIUM GROUPS

CROSS-REFERENCE TO RELATED PATENT APPLICATION

This application is a divisional application of my copending application, U.S. Ser. No. 289,289, filed Aug. 3, 1981, and issued Jan. 3, 1984 as U.S. Pat No. 4,424,272.

BACKGROUND OF THE INVENTION

Dye mordants capable of converting to non-mordanting species in the presence of alkali are known. Such mordants have been disclosed for use in photographic elements to retain in a given layer of the element a light-filtering or anti-halation dye, such retention being of particular benefit in the manufacturing and storage of the element. During processing of the element in an alkaline processing bath, the mordant material undergoes a chemical change effectively destroying the mordanting capacity of the material and, thus, facilitating release of the dye from its layer and desired removal or bleaching of the dye from the photographic element.

Thus, U.S. Pat. No. 3,575,993 relates to certain mordant materials comprising a quaternary nitrogen moiety attached to a bulky residue and disclosed to be useful for retention of organic acid light-filtering and anti-halation dyes in appropriate layers of a photographic element. The mordant materials are further disclosed to be capable of releasing the mordanted dye during processing of the element in an alkaline processing bath, thus, facilitating desired removal of the dye from the element. Release of the dye is disclosed to be accomplished by alkali-induced destruction of the mordanting capacity of the mordant material, either by decomposition of the mordant to separate the quaternary nitrogen fragment from the bulky residue or by a rearrangement reaction which produces a zwitterion with resultant internal charge compensation and loss of mordanting capacity. In addition to allowing release of light-filtering and anti-halation dyes from the mordanted layer, the destruction of mordanting capacity is also disclosed to minimize retention in the element of sodium thiosulfate fixer used in the processing of the element. Additional U.S. patents relating to the mordant materials disclosed in U.S. Pat. No. 3,575,993 and to photographic elements comprising such mordant materials are U.S. Pat. Nos. 3,444,138 and 3,455,693.

U.S. Pat. No. 3,425,833 relates to certain quaternary nitrogen mordant materials comprising a phenolic residue. These mordant materials are also disclosed to be useful for retention of organic acid light-filtering and anti-halation dyes in photographic layers and to be capable of releasing the dye in the presence of an alkaline processing bath. The mechanism of dye release is disclosed to involve conversion of the mordant material to a zwitterionic species with resultant loss of mordanting capacity.

U.S. Pat. No. 3,425,834 discloses various mordant materials also intended for utilization in the retention and subsequent release of light-filter and anti-halation dyes in photographic layers. The subject mordants are disclosed to comprise alkali-cleavable alkylamino groups or nitrogen heterocyclic nuclei attached to a bulky residue. As disclosed therein, the processing of a photographic element containing a layer of the mordant material in an alkaline processing bath functions to destroy the mordanting capacity of the material by means of alkali-induced cleavage of the material with a resultant splitting-off of the mordanting nitrogen moiety from the bulky residue. As a result, removal of the mordanted dye from the system is facilitated and retention of thiosulfate ion from the fixing bath used in processing is disclosed to be minimized.

SUMMARY OF THE INVENTION

The present invention relates to a novel class of polymeric mordants which are capable of mordanting organic dye materials and which, in an alkaline environment, undergo chemical reaction to convert from a mordant to a non-mordanting product, thereby releasing the mordanted organic dye. This novel class of polymeric mordants provides the advantage of allowing for modification in the rate of conversion from mordant to non-mordant, thereby allowing modulation of the rate of dye release, such that the polymeric mordants can be suitably employed in a variety of applications.

The present invention also relates to sheet-like elements comprising a support carrying a layer containing a polymeric mordant of the present invention. The mordant layer can also contain an organic dye, a major proportion of which is fixed in the layer by means of being mordanted to the aforementioned polymeric mordant. In one embodiment of the invention, the organic dye is an anti-halation or light-filter dye of a type heretofore known in the art. The polymeric mordant used in the layer in association with such dyes preferably undergoes a relatively rapid conversion from mordant to non-mordant, such that the dye can be removed from the element at a relatively rapid rate shortly after initial exposure of the mordant layer to an alkaline environment.

In another embodiment of this invention, the sheet-like element comprising the polymeric mordant layer is adapted for use in diffusion transfer processes and comprises, in addition to the support and mordant layer, a photosensitive silver halide emulsion layer having associated therewith a diffusion transfer image dye-providing material. In such elements, the mordant preferably undergoes a relatively gradual conversion from mordant to non-mordant in the presence of an alkaline diffusion transfer processing composition, such that the mordant layer functions to prevent or retard unintended diffusion of at least a portion of the image dye-providing materials during the initial stages of diffusion transfer processing. Thus, the mordant layer functions as a diffusion control layer, the "control" consisting of temporarily mordanting the image dye-providing material so as to prevent or retard unintended diffusion thereof during the initial stages of processing and then releasing the material such that it can diffuse in an intended manner with resultant color transfer image formation.

For a fuller understanding of the nature and objects or the present invention, reference should be had to the following detailed description taken in connection with the accompanying drawing.

DETAILED DESCRIPTION OF THE INVENTION

Figure 1:
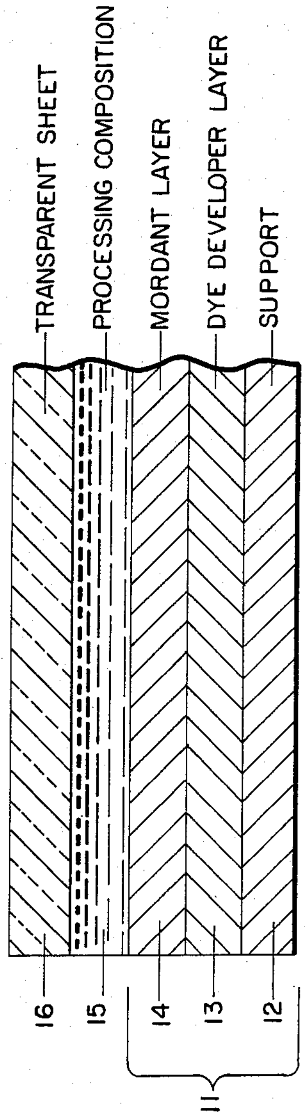
FIG. 1 is a cross-sectional view of a model arrangement for measuring the dye retention and release properties of layers comprising the polymeric mordants of this invention.

As mentioned previously, the present invention relates to a new class of polymeric mordants which are capable of converting to non-mordanting species in an alkaline environment. As illustrated hereinbelow, the subject mordants are believed to undergo alkaline hydrolysis to produce a product which undergoes an elimination reaction which functions to destroy the mordanting capacity of the polymer. Inasmuch as the rate at which this reaction sequence occurs can be altered in a predetermined manner by various means described with particularity hereinafter, the rate at which the mordanting capacity of the polymer is destroyed can be modulated to suit particular applications.

The polymeric mordants of this invention are polymers comprising recurring units of the formula (I)

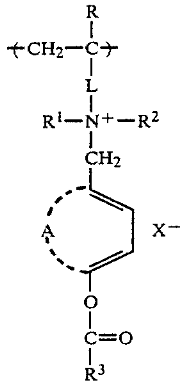

wherein R is hydrogen or lower alkyl; each of $R^1$ and $R^2$ is independently lower alkyl, e.g., methyl, ethyl, isopropyl, or butyl; cycloalkyl, e.g., cyclohexyl; substituted lower alkyl, e.g., hydroxyethyl or hydroxypropyl; aralkyl, e.g., benzyl; or $R^1$ and $R^2$ taken together represent the atoms necessary to complete a saturated N-containing ring to provide, e.g.,

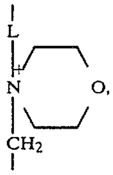 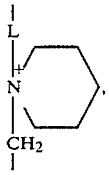, or 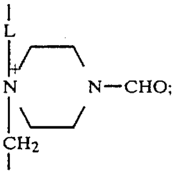

L is a divalent linking group; A represents the atoms necessary to complete an arylene nucleus, e.g., a naphthalene or, preferably, a phenylene nucleus; $R^3$ is lower alkyl, e.g., methyl, ethyl, propyl, isopropyl, or t-butyl; substituted lower alkyl, e.g., trifluoromethyl, or 2,2,2-trichloroethyl; aryl, including substituted aryl, e.g., phenyl, tolyl, p-nitrophenyl, p-methoxyphenyl, or p-bromophenyl; aralkyl, e.g., benzyl; alkoxy, e.g., methoxy, ethoxy, or 2,2,2-trichloroethoxy; and aryloxy, e.g., phenoxy; and $X^-$ is an anion.

The destruction of the mordanting capacity of the polymer is believed to involve a two step reaction sequence whereby the quaternary nitrogen moiety is converted to a non-mordanting tertiary nitrogen moiety. In the first step, the ester group

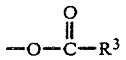

undergoes alkaline hydrolysis to provide a phenoxide anion. In the second step, the resultant anionic structure undergoes an elimination reaction with resultant elimination of a quinone-methide moiety from the polymer and conversion of the quaternary nitrogen to a non-mordanting tertiary nitrogen. This reaction sequence is illustrated below with a recurring unit of formula (I) wherein the moiety A completes a phenylene nucleus and hydroxide anion is employed to effect the hydrolysis reaction:

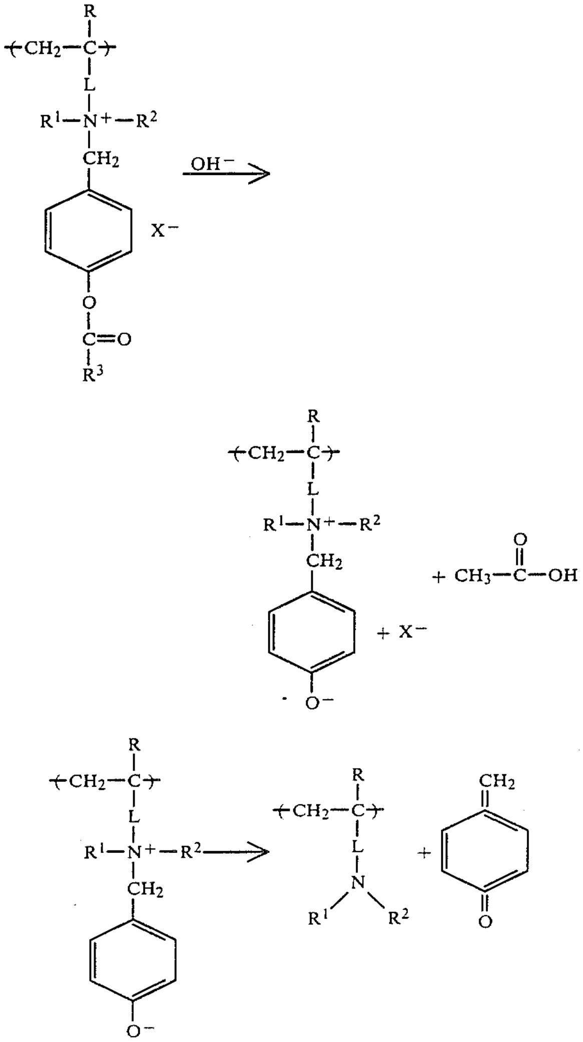

The alkaline hydrolysis of the ester group is a relatively slow reaction as compared to the elimination reaction and, thus, is a rate controlling step which is largely determinative of the rate at which the polymer is converted to a non-mordant. Accordingly, adjustment of the rate at which the hydrolysis reaction occurs can be used to modulate the rate of dye release, as appropriate for a given usage or photographic process. The rate at which the hydrolysis reaction occurs can be adjusted by such means as utilizing different $R^3$ groups to alter the reactivity of the ester group, i.e., the rate at which the ester group undergoes hydrolytic cleavage in the presence of alkali; modulating the alkali solubility or hydrophilicity of the polymeric mordant so as to affect the ability of the alkali to contact the ester function, e.g., by utilizing different $R^1$, $R^2$, or $R^3$ groups or by incorporating appropriate comonomeric units into the polymeric mordant; or modulating the permeability of the polymeric mordant layer to water, alkali or aqueous alkaline processing composition, with increased permeability generally resulting in a faster rate of hydrolysis. The permeability of the polymeric mordant layer can be modulated by such means as using appropriate other materials, particularly polymeric or proteinaceous materials, in the mordant layer, such materials functioning to modulate the permeability of the layer by, for example, having a particular alkali solubility or by altering the hydrophobic-hydrophilic balance of the layer. In addition, the permeability of the mordant layer to alkali may be modulated by alteration of the polymeric mordant itself, e.g., by the aforementioned utilization of different $R^1$, $R^2$, $R^3$ groups or by inclusion of appropriate comonomeric units into the polymer structure.

A preferred means of adjusting the rate of hydrolysis of the ester group is the aforementioned utilization of different $R^3$ groups to alter the reactivity thereof. Such alteration in reactivity may be due, for example, to inductive effects caused by $R^3$. In general, those $R^3$ groups tending to increase the electron deficiency of the ester carbonyl group, i.e., tending to draw electrons away from the carbonyl group, will increase the susceptibility of the carbonyl group to nucleophilic attack, e.g., by hydroxide anion, thus resulting in an increased rate of ester hydrolysis. Conversely, those groups tending to lessen the electron deficiency of the carbonyl group, i.e., tending to provide electrons to the carbonyl group, will generally lessen the susceptibility of that group to such attack, thus resulting in a slower rate of hydrolysis. Thus, utilization of electron-withdrawing $R^3$ groups, e.g., p-nitrophenyl or trifluoromethyl, will generally be favored in applications wherein a relatively rapid rate of dye release is desired, whereas groups tending to provide electrons, e.g., alkoxy groups such as methoxy, will generally be favored for applications wherein a relatively slow rate of dye release is desired. The relative inductive effects of the various groups denoted herein as suitable for use as the $R^3$ group are well known in the art and, accordingly are not seen as requiring further elucidation herein.

In addition to altering the reactivity of the ester group by means of inductive effects, the $R^3$ group may also affect the hydrolysis rate by providing steric interference about the ester group, thus affecting the facility with which alkali is able to contact the ester carbonyl group and initiate the hydrolysis reaction. In general, more bulky groups will result in a decreased rate of hydrolysis and, thus, a decreased rate of dye release.

The linking group L can be any divalent linking group which possesses suitable alkali stability and allows the intended conversion of the polymer from mordant to non-mordant. The nature of L should be such that the tertiary nitrogen moiety resultant from the elimination reaction is a non-mordanting species. It is known, for example, that certain N,N-disubstituted anilino moieties can possess mordanting capacity, at least for certain organic dyes. Accordingly, in most applications it is preferred that that segment of the linking group bonded to the quaternary nitrogen atom be other than an arylene group. Most preferably, L is comprised of an alkylene group bonding the remainder of L to the quaternary nitrogen moiety. This preferred linking group may be represented as —L'—alkylene— wherein the alkylene group is connected to the quaternary nitrogen atom and L' is the remainder of the linking group L.

The alkylene group can be straight or branched and, preferably, is alkylene containing from 1 to 8 carbon atoms.

Preferred polymers of this invention are those wherein the atoms represented by A complete a phenylene ring and the divalent linking group is of the formula

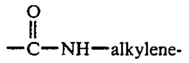

or

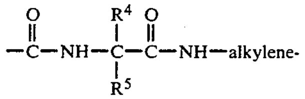

wherein alkylene is as previously defined and each of $R^4$ and $R^5$ is independently hydrogen, lower alkyl, e.g., methyl, ethyl, propyl, isopropyl; substituted lower alkyl, e.g., hydroxy methyl, hydroxyethyl, methylthioethyl; aryl, e.g., phenyl; alkaryl, e.g., tolyl; aralkyl, e.g., benzyl; cycloalkyl, e.g., cyclohexyl; or $R^4$ and $R^5$ together with the carbon atom to which they are bonded constitute a carbocyclic or heterocyclic ring. Accordingly, preferred polymers of this invention comprise recurring units conforming to either of the following formulas (II) or (III):

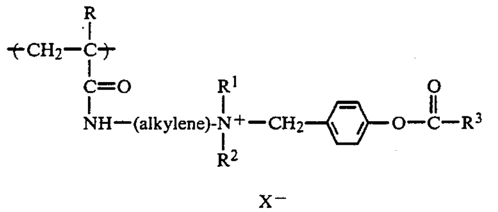
(II)

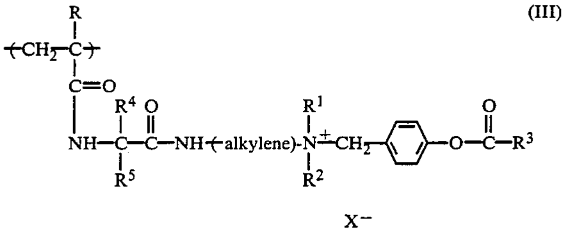
(III)

wherein R, $R^1$, $R^2$, $R^3$, and $X^-$ are as previously defined. As further described hereinafter, polymers comprising recurring units of either formula (II) or formula (III) can be prepared with facility, both as homopolymers and copolymers, and display favorable dye retention-release properties in photographic applications employing an aqueous alkaline processing composition.

With particular regard to the recurring units of formula (III), the groups $R^4$ and $R^5$ will normally be chosen based either on synthetic considerations, e.g., the availability of starting materials containing particular groups $R^4$ and $R^5$, or on the effect which the particular groups may have on the conversion from mordant to non-mordant, e.g., by rendering the polymer more or less hydrophilic. From the standpoint of synthesis of these preferred recurring units by the preferred method of derivatizing an oxazolone ring, as detailed hereinafter, each of $R^4$ and $R^5$ is preferably lower alkyl and, most preferably, methyl.

The copolymers of this invention can comprise two or more different recurring units of formula (I), i.e., units of formula (I) differing from one another in one or more of the variables R, $R^1$, $R^2$, $R^3$, A, or L. Alternatively, the copolymers of this invention can comprise, in addition to the recurring units of formula (I), other recurring comonomeric units derived from various ethylenically unsaturated comonomers such as styrene and the various acrylamides, acrylates, and acrylic acids. In general, comonomeric units are included in the polymers to provide particular predetermined properties such as a desired solubility, viscosity, or hydrophobic-hydrophilic balance. The comonomeric units may also function to provide desired properties to a layer containing the polymer, e.g., a desired permeability to alkali. Ethylenically unsaturated comonomers which can be employed in the preparation of copolymers of the present invention include acrylic acid; methacrylic acid; ethyl acrylate; methyl acrylate; methyl methacrylate; butyl acrylate; acrylamide; methacrylamide; N-methylacrylamide; N,N-dimethylacrylamide; diacetoneacrylamide; and 2-acrylamido-2-methylpropane sulfonic acid.

Preferred polymers of this invention conforming to either formula (II) or formula (III) include the following:

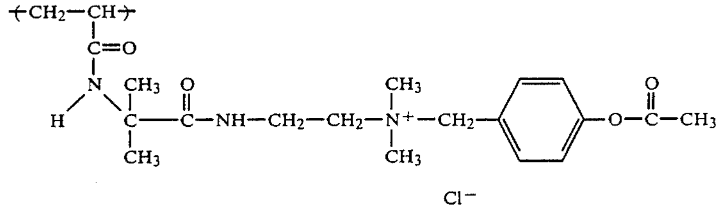
(1)

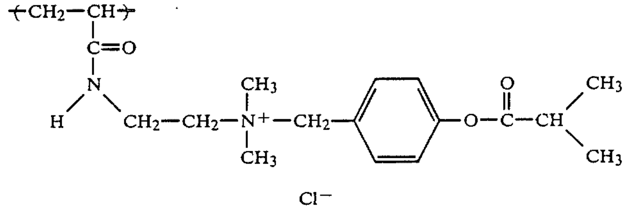
(2)

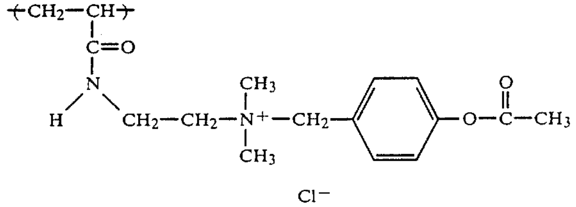
(3)

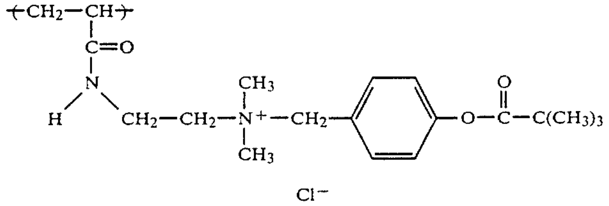
(4)

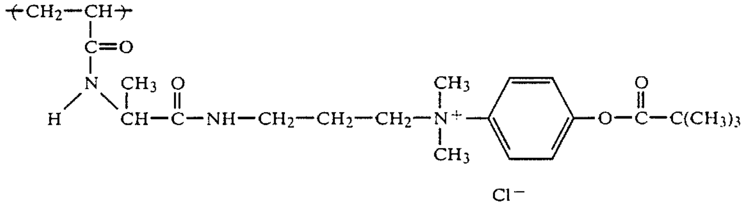
(5)

-continued
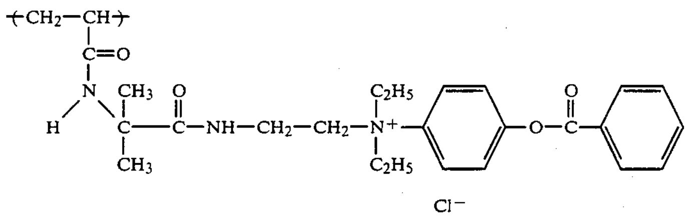
(6)
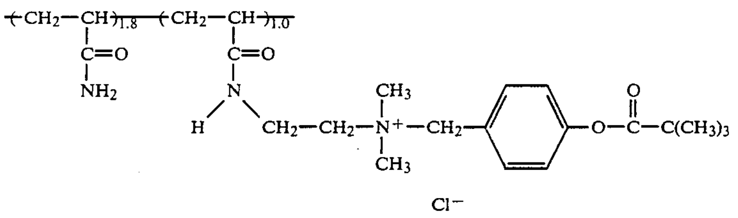
(7)
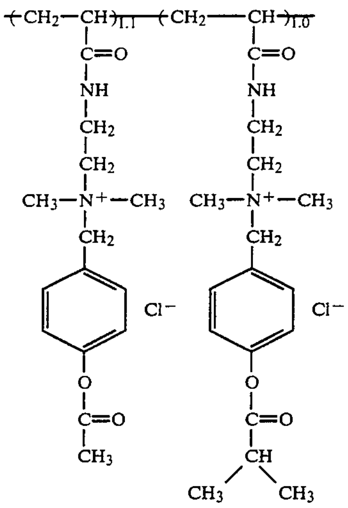
(8)
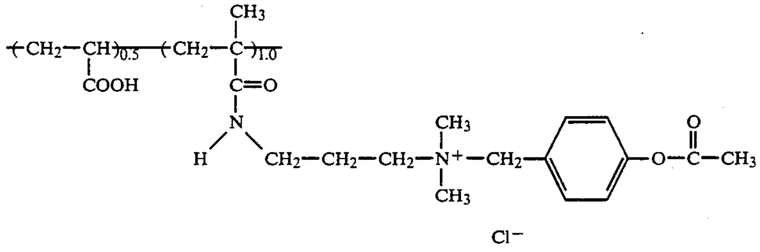
(9)
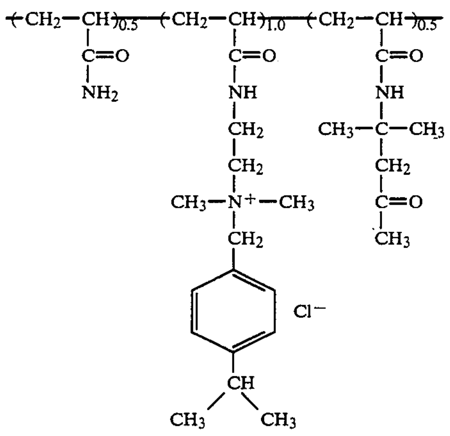
(10)

-continued

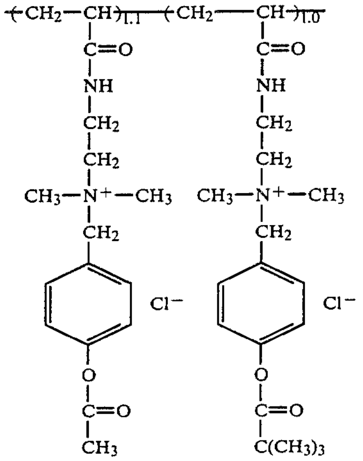

(11)

As indicated previously, materials other than the mordant polymers of this invention can be included in the mordant layer. Generally, such materials are employed to adjust the rate at which the aforementioned ester hydrolysis occurs by means of modulating the permeability of the layer to alkali, water, or aqueous alkaline processing composition. For example, incorporation of relatively hydrophobic materials, e.g., relatively hydrophobic polymeric materials, into the mordant layer will generally function to retard permeation of the aforementioned alkali, water, or aqueous alkaline processing composition into the layer, resulting in either a delay in the occurrence of the hydrolysis reaction or a relatively gradual rate of hydrolysis. Alternatively, incorporation of relatively hydrophilic materials into the layer, e.g., gelatin, will generally facilitate permeation of the aforementioned materials in the layer, thereby promoting a relatively rapid hydrolysis reaction. In addition to modulating the hydrophobic-hydrophilic balance of the mordant layer, other materials employed therein can affect the rate of alkaline hydrolysis and dye release by, for example, hardening the layer or neutralizing a portion of the alkali permeating into the layer. Materials which may be employed in the polymeric mordant layers of this invention include homo- and copolymeric materials derived from the various ethylenically unsaturated monomers such as acrylic acid; methacrylic acid; methylmethacrylate; 2-acrylamido-2-methylpropane sulfonic acid; acrylamide; methacrylamide; ethyl acrylate; butyl acrylate; diacetone acrylamide; and N,N-dimethylacrylamide. Hydrophilic colloids such as various types of gelatin can also be employed in the mordant layer, e.g., to increase the permeability of the layer to alkali. It will be appreciated that materials included in the mordant layer in addition to the polymeric mordants hereof should not possess an unacceptable degree of affinity for the dye intended to be mordanted, so as not to unacceptably impede the release of dye from the layer.

The polymeric mordants of this invention can be employed for retention and release of a variety of organic dyes. Generally, the mordants are employed in layers coated on suitable supports and the present invention accordingly provides sheet-like elements comprising a support carrying a layer containing a polymeric mordant of formula (I). The elements of this invention can also contain an organic dye capable of being mordanted by the polymeric mordant. The organic dye can be contained in the mordant layer or in a separate layer associated with the mordant layer such that the dye, in an alkaline environment, is able to migrate into the mordant layer prior to loss of the mordanting capacity.

Particularly useful elements of this invention are those adapted for use in photographic products and processes. Such elements may be photosensitive and comprise, as the photosensitive component, a silver halide emulsion, or the elements can be non-photosensitive as appropriate for a given photographic application.

In one embodiment of this invention, the element is a photosensitive element comprising, in addition to the aforementioned support and polymeric mordant layer, a photosensitive silver halide emulsion layer and an organic anti-halation or light-filter dye capable of being mordanted by the polymeric mordant. Normally, the anti-halation or light-filter dye is initially contained within the mordant layer, e.g., incorporated into the mordant laycr during manufacture of the element, such that the mordant layer provides the desired functionality of decreasing halation or absorbing certain wavelengths of light during exposure of the element. Initial mordanting of the dye within the layer provides the advantage of preventing or minimizing diffusion of the dye from the layer during fabrication and storage of the element.

Following photoexposure of the aforesaid elements, the polymeric mordant can be converted to a non-mordanting product, as described hereinabove, thus releasing the mordanted anti-halation or light-filter dye and permitting or facilitating its being rendered ineffective, e.g., by dissolving the dye out of the element into a processing bath or by bleaching of the dye. Generally, it is preferred that the dye be released at a relatively rapid rate so that a maximum amount of dye is rendered ineffective in a minimum amount of time. Accordingly, it is preferred that the polymeric mordant employed in association with the anti-halation or light-filter dye be capable of undergoing a relatively rapid conversion from mordant to non-mordant and that the mordant layer be comprised of materials facilitating permeation of alkali into the layer.

A mordant layer of this invention comprising a mordanted anti-halation dye may be positioned in the aforementioned photosensitive elements as a backing layer positioned between the support and the silver halide emulsion layer(s) of the element or, if the support is transparent, on that side of the support opposite the silver halide emulsion layer(s). Any anti-halation dye known in the art and capable of being satisfactorily mordanted by the instant polymers can be employed in the elements of this invention.

A mordant layer of this invention comprising a mordanted light-filter dye may be positioned in the aforementioned photosensitive elements as an overcoat layer, i.e., overlying the silver halide emulsion layer(s) of the element so as to protect the emulsion layers from exposure to wavelengths of actinic radiation absorbed by the mordanted filter dye. Alternatively, such light-filtering layers may be positioned between silver halide emulsion layers sensitized to different regions of the visible spectrum, e.g., to protect underlying red- and green-sensitive emulsions from the action of blue light. In addition, the mordant/light-filter layer may also contain the photosensitive silver halide emulsion, although in most applications it is preferred that the silver halide be contained in a separate layer.

As used herein, the term "light-filter dye" is intended to include a dye capable of absorbing radiation wavelengths outside of the visible spectrum, e.g., ultraviolet or infrared wavelengths, as well as wavelengths in the visible spectrum. Any light-filter dye known in the art and capable of being satisfactorily mordanted by the instant polymers can be employed in the elements of this invention.

The amounts and proportions of mordant and anti-halation or light-filter dye employed in the elements of this invention can vary over a wide range and will depend on the nature of the materials being employed and on the specific photographic element and process. Optimum amounts and proportions can be determined for various photographic systems by methods well known in the art.

In another embodiment of this invention, the sheet-like element is a photosensitive element specifically adapted for use in photographic color diffusion transfer processes and comprising, in addition to the aforementioned support and polymeric mordant layer, a silver halide emulsion having associated therewith a diffusion transfer process image dye-providing material capable of being temporarily mordanted by the polymeric mordant. The image dye-providing material may be contained in the mordant layer, at least a major proportion of the material being mordanted in the layer by the polymeric mordant, or it can be in a separate layer associated with the mordant layer such that, during processing, at least a portion of the image dye-providing material can diffuse into the mordant layer and be temporarily mordanted therein. In such elements, the mordant layer can function primarily as a diffusion control layer which prevents or retards unintended diffusion of at least a portion of the diffusible image dye-providing material during the early stages of diffusion transfer processing. Thus, the polymeric mordant substantially retains its mordanting capacity for a predetermined period of time after exposure to an aqueous alkaline processing composition and, accordingly, mordants at least a portion of the image dye-providing material and prevents its diffusion for such period of time. Thereafter, the mordant converts to a non-mordanting product so as to release and permit the intended diffusion of the image dye-providing material. Various advantages may attend such diffusion control, as set forth hereinafter.

Color diffusion transfer products and processes are now well known. Typically, a color diffusion transfer film unit comprises a support carrying a photosensitive silver halide emulsion layer having associated therewith a diffusion transfer process image dye-providing material. Following photoexposure, the silver halide emulsion is developed with an aqueous alkaline processing composition and, as a function of development, an imagewise distribution of diffusible image dye-providing material is formed which is transferred, at least in part, to a superposed image-receiving layer to provide a color image therein.

Multicolor images may be prepared in such film units comprising at least two selectively sensitized silver halide emulsion layers, each associated with an image dye-providing material which provides an image dye possessing spectral absorption characteristics substantially complementary to the predominant sensitivity range of its associated emulsion. The most commonly employed negative elements for forming multicolor images are of the tripack structure, and contain blue, green, and red sensitive silver halide layers having associated therewith in the same or a contiguous layer a yellow, a magenta, and a cyan image dye-providing material respectively. Generally, each silver halide emulsion and its associated image dye-providing material is spaced from the next adjacent silver halide-image dye-providing material combination by an alkaline solution permeable spacer layer.

As disclosed in U.S. Pat. No. 2,983,606 and a number of other patents, image dye-providing materials which are particularly useful in forming multicolor images by diffusion transfer are the dye developers, i.e., compounds which contain, in the same molecule, both the chromophoric system of a dye and also a silver halide developing function. In a typical diffusion transfer film unit, each dye developer is associated with a separate silver halide emulsion layer and is, most preferably, substantially soluble only in the reduced form at the first pH provided by the processing composition, possessing subsequent to photoexposure or processing a spectral absorption range substantially complementary to the predominant sensitivity range of its associated emulsion. Following photoexposure, the processing composition is applied and permeates the emulsion layers to initiate development. The dye developer is immobilized or precipitated in exposed areas as a consequence of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer, said transfer substantially excluding oxidized dye developer. The image-receiving layer receives a depthwise diffusion, from the developed emulsion, of unoxidized dye developer without appreciably disturbing the imagewise distribution thereof to provide the reversed or positive color image of the developed image. The image-receiving layer may contain agents adapted to mordant or otherwise fix the diffused, unoxidized dye developer.

For purposes of illustration, the elements of this invention adapted for use in diffusion transfer processes will hereinafter be described in terms of dye developers which function as described above, although no limitation of the invention to the illustrative image dye-providing materials is intended.

In multicolor diffusion transfer products such as those described above, undesirable inter-image effects may occur whereby a given dye developer or other image dye-providing material is controlled as a result of association with a silver halide emulsion layer other than the one with which it was initially associated in the film unit. This unintended associative relationship generally results from migration of the image dye-providing material to a silver halide layer other than the one with which it is initially associated prior to development of this "wrong" emulsion layer. As a result of this premature migration, the image dye-providing material may acquire diffusion characteristics opposite to those it would normally possess had it remained in association with its intended controlling silver halide layer. For example, if a dye developer prematurely migrates to a silver halide layer other than the one with which it is initially associated, it may undergo oxidation to a non-diffusible species as a function of the development of this "wrong" layer and will be rendered incapable of transferring as intended to the image-receiving layer. As a result, accuracy in color reproduction and color saturation within the transfer image will be adversely affected. In addition a portion of a second dye developer which should have undergone oxidation as a function of the development of this "wrong layer" remains in a reduced and diffusible state and, thus, may transfer to further adversely affect the color accuracy of the resultant color transfer image.

In the aforementioned photosensitive elements of this invention specifically adapted for use in color diffusion transfer processes, the polymeric temporary mordants hereof can be employed to provide diffusion control of the dye developer so as to aid in minimizing the aforementioned inter-image effects. Thus, by temporarily mordanting the diffusible dye developer during the early stages of processing, the polymeric mordant can function to prevent or minimize migration of the dye developer away from its associated silver halide emulsion layer, at least prior to substantial development of that layer and of other silver halide layers of the element or film unit, thus permitting improved control of the dye developer as a function of the development of its associated silver halide layer.

Any suitable arrangement of the polymeric temporary mordant, dye developer, and silver halide can be employed to provide the desired diffusion control of the dye developer by the mordant. Suitable arrangements can include (a) the silver halide, dye developer and polymeric mordant contained in the same layer; (b) the polymeric mordant and dye developer in a layer associated with a layer of the silver halide emulsion; or (c) the polymeric mordant contained in a layer positioned between a layer of the silver halide emulsion and a layer of the dye developer, with arrangements (b) and (c) being preferred. While arrangements (a) and (b) provide for the dye developer to be present in the element as a mordanted and, thus, non-diffusible species prior to processing, arrangement (c) provides the dye developer as an initially diffusible species which, during processing, diffuses to the mordant layer, is temporarily mordanted therein for a predetermined period of time, and then diffuses to its associated silver halide layer wherein it undergoes the desired imagewise oxidation.

For purposes of the above-described diffusion control of dye developer, preferred polymeric mordant layers are those wherein the mordant undergoes a relatively slow conversion to non-mordant or, most preferably, undergoes a delayed conversion whereby it retains essentially all of its mordanting capacity for a predetermined period of time during the early stages of processing and then undergoes a relatively rapid conversion to a non-mordanting product. Accordingly, preferred polymeric mordants for employment in such layers are those which undergo a relatively slow or a delayed alkaline hydrolysis, such characteristics being imparted to the mordant by, for example, the aforementioned utilization of either different groups $R^1$, $R^2$, $R^3$, $R^4$, or $R^5$ or appropriate comonomeric units to impart to the polymer a desired hydrophobicity or alkali solubility or by the aforementioned utilization of different groups $R^3$ to impart a desired reactivity to the ester function.

A polymeric mordant layer of this invention can also be employed in the aforementioned photosensitive elements adapted for use in diffusion transfer processes as an overcoat layer, i.e., as a layer overlying the various silver halide emulsion layers and image dye-providing materials. As such, the layer can be employed, for example, to prevent premature diffusion of the image dye-providing material situated uppermost in the element into the processing composition distributed between the element and the aforementioned image-receiving layer.

The supports employed in the sheet-like elements of this invention may be opaque or transparent as appropriate for a given utilization. The supports may comprise any of the rigid or flexible sheet materials, for example, glass, paper, and polymeric films of both the natural and synthetic types. Especially suitable sheet materials comprise flexible synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetatebutyrate, or acetate propionate; polycarbonates; polystyrenes; and the like.

Silver halides which may be employed as the photosensitive component of the photosensitive elements of this invention include silver chloride, silver bromide, and silver iodide and mixed silver halides such as silver chlorobromide, silver chloroiodobromide, and silver iodobromide. Preferably, the silver halide is dispersed in a water-permeable and swellable binder material such as an appropriate synthetic polymer material or, preferably, a gelatin matrix. The silver halide may be monochromatically or panchromatically sensitized by optical sensitizing dyes in accordance with procedures known in the art.

The photographic elements of this invention may comprise photographically useful layers in addition to those specifically mentioned hereinabove, e.g., spacer layers, alkali neutralization layers, reflective layers, and various other layers of known photographic utility. The photographic elements generally can be fabricated employing conventional coating methods. Coating aids such as surfactants, thickeners, and dispersants may be employed to facilitate coating the various layers of the element, including the polymeric mordant layer.

The organic dye retention-release properties of a mordant layer of this invention can be evaluated by utilization of the test structure shown in FIG. 1. The structure shown in the FIGURE allows monitoring the diffusion of the organic dye through the mordant layer in the presence of an aqueous alkaline processing composition. Diffusion of the dye is monitored in relation to time. The retention-release properties of the layer can be evaluated in simulation of the functioning of the material, e.g., as a diffusion control layer in a diffusion transfer film unit. The test structure and suitable methods of evaluation are set forth in detail in Examples 7 and 8 hereof.

The instant polymeric mordants may be prepared by quaternizing an ethylenically unsaturated compound of the formula

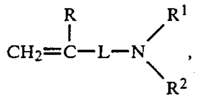
(IV)

wherein R, $R^1$, $R^2$, and L are as previously defined, by reaction with a compound of the formula

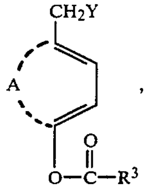
(V)

wherein Y is halogen and A and $R^3$ are as previously defined, to provide a monomer of the formula

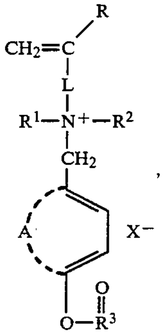
(VI)

wherein $X^-$ is as previously defined, and polymerizing the monomer.

The quaternization reaction can be carried out in any of a variety of inert organic solvents commonly employed in such reactions such as ethyl acetate, acetone, toluene tetrahydrofuran, and methylethylketone. Preferred solvents are those in which both the reactants are soluble and the quaternary salt product insoluble such that it can be readily isolated by filtration of the reaction mixture. If further purification of the quaternary salt is desired, it may be recrystallized from an appropriate organic solvent. Acetonitrile has been found to be a particularly useful recrystallization solvent. Generally, the quaternization reaction is carried out by dissolving the reactants in a suitable solvent containing a small amount of a polymerization inhibitor such as t-butylhydroquinone.

With regard to preparation of the preferred polymers comprising recurring units of formula (II), the compound of formula (IV) employed in the above method is of the formula

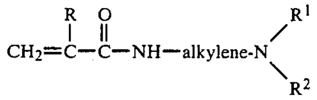
(VII)

and the moiety A completes a phenylene ring. Compounds of formula (VII) can be prepared by reaction of acrylyl chlorides, anhydrides, or esters of the formulas

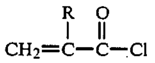

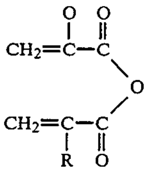

and

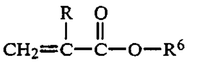

respectively, wherein R is as previously defined and $R^6$ is alkyl or aryl, with an N,N-disubstituted alkylene diamine of the formula

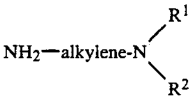

wherein $R^1$, $R^2$, and alkylene are as previously defined. The reaction can generally be conducted with facility using known techniques of reacting primary amines with the aforementioned acrylyl chlorides, anhydrides, or esters.

In preparing the preferred polymers of formula (III) by the above method, the compound of formula (IV) is (VIII)

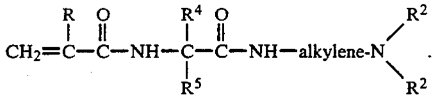

This compound is preferably prepared by derivatizing a 2-alkenyl-5-oxazolone with the aforesaid N,N-disubstituted alkylene diamine in accordance with the following reaction:

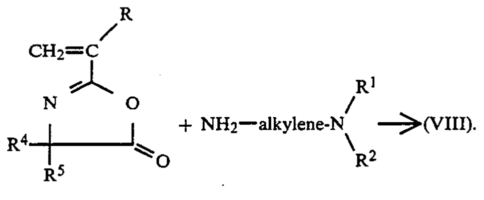

As disclosed in the copending U.S. patent application Ser. Nos. 130,527 and 238,068, filed Mar. 14, 1980 and Mar. 2, 1981, respectively, both in the name of Lloyd D. Taylor, 2-alkenyl-5-oxazolones of the above formula can be prepared from an N-acrylyl-α-amino acid of the formula

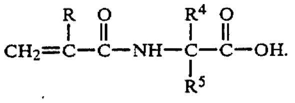

For example, the N-acrylyl-α-amino acid can be reacted with an alkyl haloformate such as ethyl chloroformate to prepare a 2-alkenyl-5-oxazolone as described, for example, by Taylor et al., J. Polym. Sci. B, vol. 7, 597 (1969). Benzyl haloformates may also be utilized. N-acrylyl-α-amino acids may also be reacted with anhydrides such as acetic anhydride and trifluoroacetic anhydride to undergo a cyclodehydration reaction to form 2-alkenyl-5-oxazolones as described, for example, by J. W. Lynn in J. Org. Chem., 24, 1030 (1959) and in British Pat. No. 1,121,418. Such oxazolones may also be prepared by reacting the N-acrylyl-α-amino acid with a carbodiimide such as dicyclohexylcarbodiimide or N-ethyl-N'-(γ-dimethylaminopropyl)carbodiimide hydrochloride. Formation of 5-oxazolones by this method is disclosed by Chen, et al., Synthesis, No. 3, p. 230, (1979).

As further disclosed in the above-cited patent applications, the reactivity of 5-oxazolone rings toward nucleophilic groups, such as primary amino groups, is known. See, for example, U.S. Pat. No. 3,488,327 and the previously referenced British Pat. No. 1,121,418. In general, such derivatization reactions proceed readily and in high yield. However, it has been found that the reaction may be facilitated by use of a 4-dialkylamino pyridine catalyst such as 4-N,N-dimethylamino)pyridine of 4-pyrrolidinopyridine.

Derivatization of the 2-alkenyl-5-oxazolone with the aforementioned N,N-disubstituted alkylene diamine can be conducted in inert organic solvents such as tetrahydrofuran, chloroform, dichloromethane, dimethylformamide, benzene, dioxane, toluene, acetone, methylethylketone, and ethyl acetate. The reaction may be conducted over a temperature range of about 0° C. to about 100° C. In addition, it may prove desirable to include a small amount of polymerization inhibitor such as hydroquinone or t-butylpyrocatechol in the derivatization reaction mixture to prevent premature polymerization. In a typical derivatization reaction, the 2-alkenyl-5-oxazolone and N,N-disubstituted alkylene diamine are added to an appropriate solvent and stirred until reacted. The reaction mixture may be heated if necessary to dissolve either of the reagents or to increase the rate of reaction. Upon completion of the reaction, as determined, for example, by monitoring techniques such as infrared analysis or thin layer chromatography, the product may be isolated by precipitation followed by filtration.

Monomers of formula (VI) can be polymerized by different polymerization techniques such as suspension, emulsion, or, preferably, solution polymerization. The polymerization can be catalyzed or initiated by any suitable means. Preferably, the polymerization is catalyzed by a free radical catalyst such as azobisisobutyronitrile, benzoyl peroxide, diacetyl peroxide, hydrogen peroxide, or diazoaminobenzene. The amount of catalyst used and the reaction temperature can be varied as appropriate for obtaining a desired polymer. Generally, the polymerization should proceed satisfactorily at a temperature between 25° C. and 100° C., using less than 5% by weight of catalyst, based on the starting weight of polymerizable monomer or monomers. In preparing copolymers, the various monomers of formula (VI) or other ethylenically unsaturated monomers may be added simultaneously or sequentially to the reaction medium.

The preferred polymeric mordants comprising recurring units of formula (III) can also be prepared by derivatization of a polymeric 5-oxazolone and quaternization of the resultant derivative in accordance with the following reaction scheme:

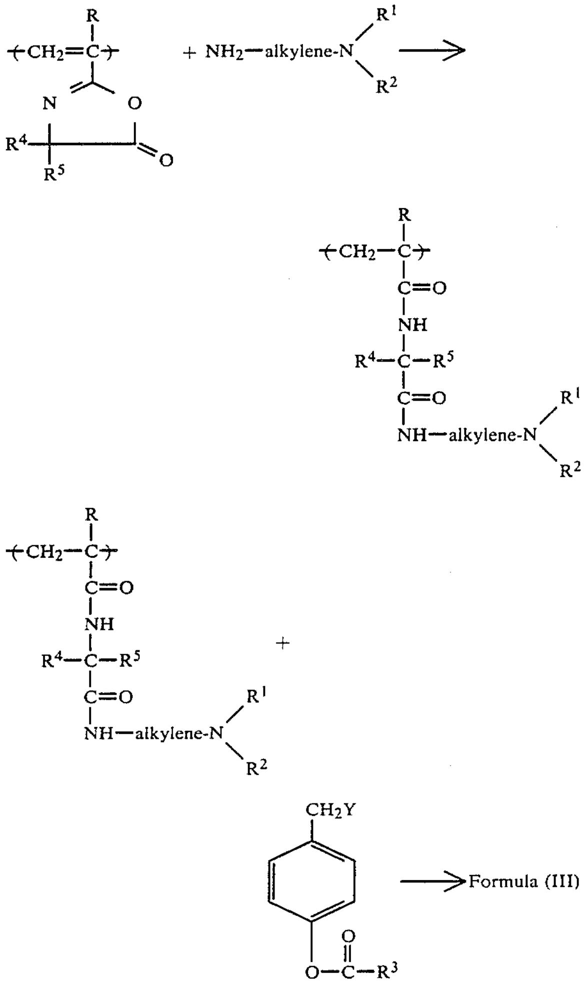

In accordance with this method of preparation the N,N-disubstituted alkylene diamine is attached directly to an existing polymer backbone. The method of attachment is an addition reaction which does not result in formation of deleterious by-products such as neighboring reactive pendant groups which might adversely affect either the stability of the pendant group formed by derivatization or the rate of conversion from mordant to non-mordant.

The polymeric 5-oxazolones utilized in the above reaction scheme may be prepared by polymerization of the aforementioned 2-alkenyl-5-oxazolones. As disclosed, for example, by Taylor, et al., J. Polym. Sci., B, vol. 9, 187 (1971), in preparing polymeric oxazolones by polymerization of 2-alkenyl-5-oxazolones, undesirable rearrangements may be minimized and a higher yield of purer, more stable polymer obtained if the substituents at the 4- position of the oxazalone ring ($R^4$ and $R^5$ herein) are other than hydrogen. Thus, with respect to the above reaction scheme, $R^4$ and $R^5$ are preferably alkyl groups. Most preferably, each of $R^4$ and $R^5$ is methyl. Illustrative polymerization techniques are described, for example, in the Taylor et al. article referenced immediately above, by Iwakura, et al., J. Polym. Sci., A-1, vol. 6, 2681 (1968), and in previously referenced U.S. Pat. No. 3,488,327 and Brit. Pat. No. 1,121,418.

2-Alkenyl-5-oxazolones can be homopolymerized or copolymerized with other ethylenically unsaturated monomers for purposes of imparting predetermined physical properties to the mordant polymer ultimately formed by the above reaction scheme. Alternatively, oxazolone in 50 cc. of benzene. The oxazolone solution contained a few milligrams of t-butylhydroquinone as a polymerization inhibitor. An external water bath was used to maintain the resultant solution at about 25° C. The solution was stirred about 2 hours, filtered through Celite, and evaporated. The residue after evaporation was triturated with hexane and the mixture filtered to provide N-(N',N'-dimethyl-β-aminoethyl)-2-methyl-2-acrylamidopropanoic acid amide as a white solid.

(b) 2 3 grams of the N-(N',N'-dimethyl-β-aminoethyl)-2-methyl-2-acrylamidopropanoic acid amide prepared in section (a) of this Example and 1.8 g. of p-(chloromethyl)phenyl acetate were dissolved in 20 ml. of ethyl acetate containing a few milligrams of t-butylhydroquinone. The solution was stirred at ambient temperature of about 25° C. for several days resulting in formation of a precipitate of the desired quaternary salt. The precipitate was filtered, washed with ethyl acetate, and dried under vacuum to yield 3 g. of the compound of the formula

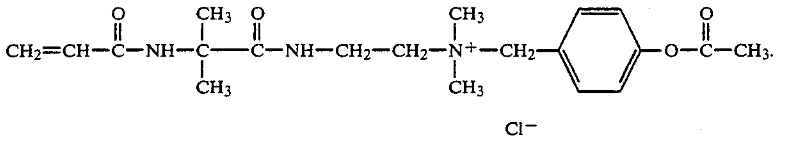

predetermined physical properties may be imparted to the polymer by derivatization of the polymeric 5-oxazolone with nucleophilic compounds which, when so introduced into the polymer, will impart thereto the desired properties. For example, the hydrophobicity of the polymer may be increased by introduction of a relatively hydrophobic alkyl group, e.g., n-butyl, into the polymer by means of derivatization with a corresponding alkyl amine or alcohol, e.g., n-butyl amine or n-butanol. The derivatization with such nucleophilic compounds can be conducted concurrently with the derivatization with the N,N-disubstituted alkylene diamine or the respective derivatization reactions may be conducted sequentially.

Derivatization of the polymeric oxazolone in accordance with the above reaction scheme is preferably conducted in the presence of a suitably inert and substantially anhydrous solvent such as tetrahydrofuran, benzene, toluene, dioxane, ethyl acetate, methylethylke- (c) 5.0 grams of the compound prepared as described in section (b) of this Example were dissolved in about 50 cc. of water containing 15 mg. of azobisisobutyronitrile. The solution was deaerated and then heated to 63° C. in an evacuated sealed tube for about 16 hours. The resultant polymer solution was cooled, dialyzed, and freeze-dried to yield 2.6 g. of a polymer of formula (1). Structure was confirmed by infrared analysis.

EXAMPLE 2

Preparation of a Polymer of Formula (2) (a) 5.0 grams of N-acrylyl-N',N'-dimethylethylenediamine and 6.7 grams of p-(chloromethyl)phenylisobutyrate were dissolved in 60 cc. of acetone containing a few milligrams of t-butylhydroquinone. The solution was refluxed for about 16 hours, cooled, and filtered to yield 9.3 g. of a white solid. This material was recrystallized from acetonitrile. The resultant white solid, of the formula

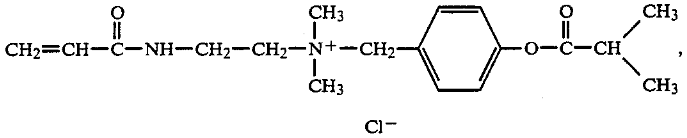

tone, chloroform, and dichloromethane. Similar to derivatization of the 2-alkenyl-5-oxazolone, the derivatization of the polymeric 5-oxazolone may be facilitated by the presence of a 4-alkylaminopyridine catalyst.

The present invention is further illustrated in the following Examples which are illustrative only and not intended to be of limiting effect.

EXAMPLE 1

Preparation of a Polymer of Formula (1)

(a) A solution of 100 g. of N,N-dimethylethylenediamine in 40 cc. of benzene was added dropwise to a stirring solution of 16.4 g. of 2-vinyl-4,4-dimethyl-5-had a melting point of 162°-63° C.

(b) 3 grams of the white solid prepared in section (a) were dissolved in 27 cc. of water containing 10 mgs. of azobisisobutyronitrile. The solution was deaerated and then heated to 63° C. in an evacuated sealed tube for about 16 hours. The resultant polymer precipitated from the solution and, upon cooling of the resultant mixture, was isolated by filtration and dried at ambient temperature under nitrogen. Yield of 2.5 g. of a polymer of formula (2) as a white solid. The polymer was soluble in aqueous ethanol.

EXAMPLE 3

Preparation of a Polymer of Formula (4)

(a) 7.5 grams of N-acrylyl-N,N'-dimethylethylenediamine and 11.3 g. of p-(chloromethyl)phenyl-2,2-dimethylpropionate were dissolved in 100 cc. of acetone containing a few milligrams of t-butylhydroquinone. The solution was refluxed about 16 hours resulting in formation of a precipitate. The mixture was cooled and the precipitate isolated by filtration. 13 grams of a white solid were obtained. This material was crystallized from 50 cc. of acetonitrile yielding 10 g. of a white solid of the formula

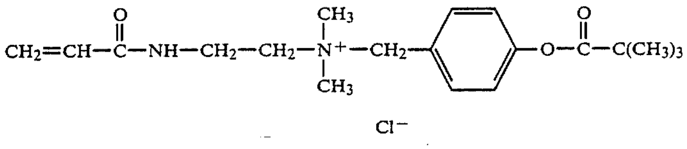

having a melting point of 174°–76° C. The structure was confirmed by infrared and nuclear magnetic resonance analysis.

(b) 5 grams of the quaternary salt prepared in section (a) were dissolved in 20 cc. of water. The solution was deaerated and about 10 mg. of azobisisobutyronitrile were added. The solution was heated at 60° C. in an evacuated sealed tube for about 16 hours. The resultant polymer of formula (4) precipitated from the solution and, upon cooling of the resultant mixture, was isolated by filtration as a white solid which was dried at ambient temperature under nitrogen. The polymer was soluble in aqueous ethanol.

EXAMPLE 4

Preparation of the Copolymer of Formula (7)

0.7 grams of acrylamide and 2 g. of the quaternary salt prepared in Example 3 (a) were dissolved in 30 cc. of water. The solution was deaerated and 3 mg. of azobisisobutyronitrile were then added. The solution was heated at 63° C. in an evacuated sealed tube for about 16 hours. A portion of the copolymer which was formed precipitated upon cooling of the solution to room temperature. The resultant mixture was diluted to 60 cc. with water, dialyzed, and freeze dried. Yield of 1.9 g. of the copolymer of formula (7). Structure was confirmed by infrared analysis.

EXAMPLE 5

Preparation of the Copolymer of Formula (8)

(a) 3.5 grams of N-acrylyl-N',N'-dimethylethylenediamine and 4.6 g. of p-(chloromethyl)phenyl acetate were dissolved in 40 cc. of acetone containing a few milligrams of t-butylhydroquinone. The solution was refluxed for about 16 hours, cooled, and the precipitated white solid isolated by filtration. 6 g. of material were obtained having a melting point of 132°–36° C. This material was recrystallized from acetonitrile yielding the compound

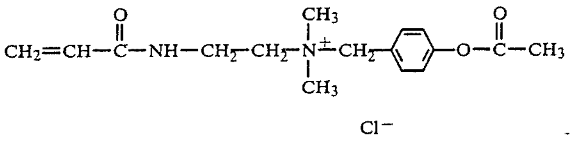

as a white solid having a melting point of 143°–45° C. Structure was confirmed by infrared and nuclear magnetic resonance analysis.

(b) 2 grams of the quaternary salt prepared in section (a) of this Example and 2 g. of the quaternary salt prepared as described in Example 2 (a) were dissolved in 40 cc. of water. The solution was deaerated and 6 mg. of azobisisobutyronitrile were added. The solution was heated to 63° C. in an evacuated sealed tube for about 16 hours, cooled, dialyzed, and freeze dried to yield 2.9 g. of the copolymer of formula (8).

EXAMPLE 6

Preparation of the Copolymer of Formula (11)

1 g. of the quaternary salt prepared as described in Example 5 (a) and 1 g. of the quaternary salt prepared as described in Example 3(a) were dissolved in a mixture of 8 cc. of water and 0.5 cc. of isopropyl alcohol. The solution was deaerated and a catalytic amount of azobisisobutyronitrile was added. The solution was then heated to 60° C. in an evacuated sealed tube for about 16 hours, cooled, dialyzed, and freeze dried to yield 1.4 g. of a white solid copolymer of formula (11).

EXAMPLE 7

The polymeric mordants of this invention were evaluated using a test structure, 11 in FIG. 1, comprising a transparent support 12; a layer 13 comprising about 270 mg./m.$^2$ of a cyan dye developer of the formula

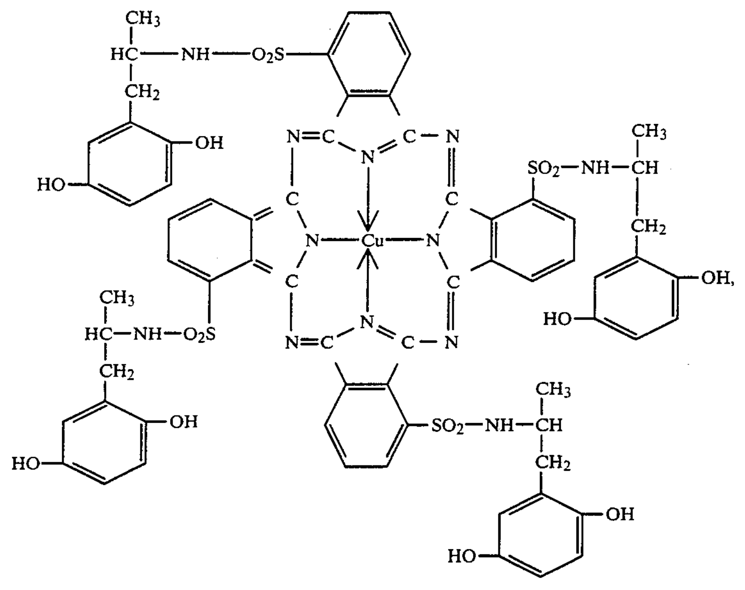

about 540 mg./m.$^2$ of gelatin, and about 10 mg./m.$^2$ of succinaldehyde; and a layer 14 comprising about 650 mg./m.$^2$ of a polymeric mordant of this invention. Layers 13 and 14 were coated sequentially on support 12. The polymeric mordant layer 14 was hand-coated out of an aqueous or aqueous alcohol solution using a conventional hand-coating rod.

A transparent sheet 16 comprising a polyester clear film base was superposed with element 11 and an alkaline processing composition 15 spread therebetween. The processing composition was comprised of the following ingredients:

| | |
|---|---|
| Benzotriazole | 168 g. |
| Bis-(β-aminoethyl)sulfide | 4 g. |
| Colloidal silica, aqueous dispersion (30% $SiO_2$) | 555 g. |
| Carbowax | 165 g. |
| Lithium hydroxide | 60 g. |
| N—(2-hydroxyethyl)-N,N',N'—triscarboxy methyl ethylene diamine | 250 g. |
| Lithium nitrate | 30 g. |
| Benzylaminopurine | 120 g. |
| 6-Bromo-5-methyl-4-azabenzimidazole | 8.5 g. |
| N—benzyl-α-picolinium bromide | 560 g. |
| N—phenethyl-α-picolinium bromide | 430 g. |
| 6-methyl uracil | 90 g. |
| Carboxymethyl hydroxyethyl cellulose | 530 g. |
| Titanium dioxide | 12,675 g. |
| Potassium hydroxide (45% aqueous solution) | 2,520 g. |
| Water | 11,000 g. |

Immediately after introduction of the processing composition the optical reflection density to red light of the sample was monitored through transparent support 12 as a function of time employing a densitometer equipped with a strip-chart recorder. The density measured as a function of time was that of the cyan dye developer in the original dye-containing layer 13 and in mordant test layer 14. Dye developer which had diffused through test layer 14 into the processing composition was masked by the titanium dioxide contained therein and, thus, did not contribute to the recorded reflection density. In this manner, the diffusion of the dye developer through the test layer and into the processing composition could be monitored. Dye developer mordanted in the test layer contributed to the red reflection density and, thus, the decrease in density over time served as an indication of the amount of dye developer first mordanted in and then released from the test mordant layer.

In a typical test, a relatively sharp drop in dye density was observed either immediately after spreading the processing composition or after a delay varying from about 1 second up to several seconds depending on the structure of the polymeric mordant. This relatively sharp drop was apparently due to some of the dye developer diffusing through the test layer without being mordanted, such occurrence being expected in view of the rapidity with which the dye developer is normally able to diffuse in such systems and further in view of the control mordant performance described hereinafter. After the relatively sharp drop in density, a more gradual decrease was observed, indicating release of mordanted dye and diffusion thereof into the processing composition. After several minutes a final density was reached which was the reflection density of the residual dye developer in layers 13 and 14 after completion of dye diffusion.

A control structure was prepared which was identical to the above-described test structure except that a conventional mordant, which did not convert to a non-mordant in the presence of the processing composition was substituted in layer 14 for the test mordants of this invention. Poly-4-vinylpyridine was utilized as the conventional mordant. In a typical test, conducted by applying the aforementioned processing composition to the control element, a rapid drop in dye density was observed immediately after application of the processing composition. Similar to such observation in the monitoring or the test elements, this rapid drop in density is believed due to passage of a portion of the dye developer through the control mordant layer without undergoing mordanting. Following this rapid drop, the density remained at a constant level, contrasting with the continuing drop in density observed in the test structure. It will be appreciated that the constant density level was indicative of the permanent retention of dye developer in the control mordant layer. Thus, a final density was reached almost immediately in the control structure and, as indicated in Table 1 below, the final density of the control was appreciably higher than those reached in the test structures.

Table 1 presents the test and control results which were obtained. In the Table, the test polymers are designated by previously assigned numbers, P4VP represents poly-4-vinylpyridine, $D_f$ is the final density, and T is the approximate time in seconds between the spreading of the processing composition and the onset of the rapid drop in density. The final density in the control structure was reached in approximately 20 seconds whereas the final densities in the test structures were reached in about 3 to 4 minutes. The initial density of the control and test structures, read about 5 seconds after application of the processing composition, was about 200.

TABLE 1

| Mordant Polymer | $D_f$ | T (sec.) |
|---|---|---|
| P4VP (Control) | 125 | 1 |
| (1) | 65 | 0 |
| (2) | 65 | 8 |
| (7) | 75 | 11 |
| (8) | 65 | 3 |
| (11) | 68 | 14 |

EXAMPLE 8

In this Example, a test structure of the type described in Example 7 and FIG. 1 was fabricated containing, as a mordant material in layer 14, a homopolymer comprising recurring units of the formula

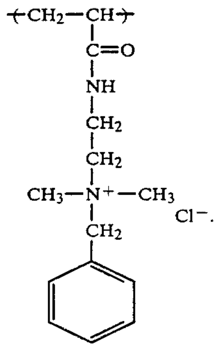

It will be appreciated that this mordant differs from the polymeric mordants of this invention and, particularly, from polymer (2) essentially only in that it does not contain an ester group in the para-position on the phenyl ring. Thus, this mordant would not be expected to be capable of undergoing quinone-methide elimination to convert to a non-mordanting product. The test structure was processed and evaluated in the manner described in Example 7. A final density of 120 was obtained in the test structure, which density is to be compared with that of 125 observed in the case of the P4VP control of Example 7 and with the appreciably lower densities of the test mordants of that Example, particularly the final density of 65 observed in the case of polymer (2).

What is claimed is:

1. A polymer comprising recurring units of the formula

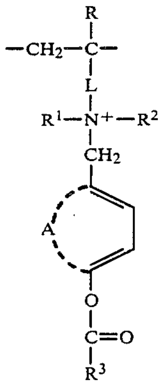

wherein R is hydrogen or lower alkyl; each of $R^1$ and $R^2$ is independently lower alkyl, cycloalkyl, substituted lower alkyl, aralkyl, or $R^1$ and $R^2$ taken together represent the atoms necessary to complete a saturated N-containing ring; L is a divalent linking group; A represents the atoms necessary to complete an arylene nucleus; $R^3$ is lower alkyl, aryl, aralkyl, alkoxy, or aryloxy; and $X^-$ is an anion; said polymer being capable of conversion in an alkaline environment to a polymer comprising recurring units of the formula

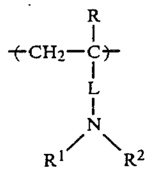

wherein R, L, $R^1$ and $R^2$ are as previously defined.

2. A polymer of claim 1 wherein A represents the atoms necessary to complete a phenylene nucleus.

3. A polymer of claim 1 wherein each of $R^1$ and $R^2$ is lower alkyl.

4. A polymer of claim 3 wherein each of $R^1$ and $R^2$ is methyl.

5. A polymer of claim 1 wherein said divalent linking group L comprises a straight or branched alkylene group bonded to the quaternary nitrogen atom of said recurring units.

6. A polymer of claim 5 wherein said alkylene group comprises from 1 to 8 carbon atoms.

7. A polymer of claim 5 comprising recurring units of the formula

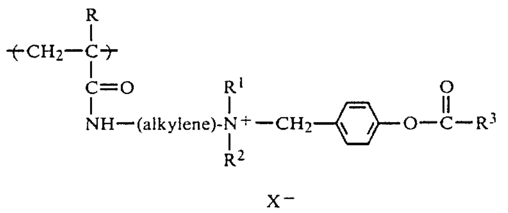

8. A polymer of claim 5 comprising recurring units of the formula

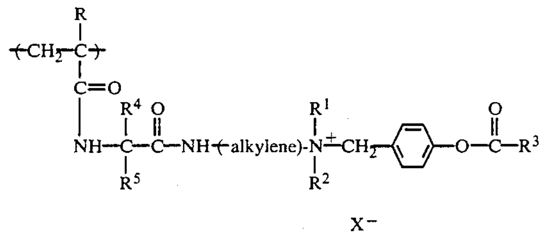

wherein each of $R^4$ and $R^5$ is independently hydrogen; lower alkyl; substituted lower alkyl; alkaryl; aralkyl; cycloalkyl; or $R^4$ and $R^5$ together with the carbon atom to which they are bonded constitute a carbocyclic or heterocyclic ring.

9. A polymer of claim 8 wherein each of $R^4$ and $R^5$ is lower alkyl.

10. A polymer of claim 9 wherein each of $R^4$ and $R^5$ is methyl.

11. A polymer of claim 1 which is a copolymer comprising, as comonomeric units, two or more different recurring units of the said formula.

12. A polymer of claim 1 wherein $R^3$ is lower alkyl.

13. A polymer of claim 12 wherein $R^3$ is selected from the group consisting of methyl, isopropyl, and t-butyl.

14. A polymer of claim 1 further comprising recurring comonomeric units of an ethylenically unsaturated comonomer.

15. A polymer of claim 14 wherein said comonomer is acrylamide.

* * * * *